United States Patent [19]
Lai

[11] 3,969,139

[45] July 13, 1976

[54] LITHIUM ELECTRODE AND AN ELECTRICAL ENERGY STORAGE DEVICE CONTAINING THE SAME

[75] Inventor: San-Cheng Lai, Woodland Hills, Calif.

[73] Assignee: Rockwell International Corporation, El Segundo, Calif.

[22] Filed: Aug. 18, 1975

[21] Appl. No.: 605,691

Related U.S. Application Data

[63] Continuation of Ser. No. 512,635, Oct. 7, 1974.

[52] U.S. Cl............................. 136/6 LN; 136/6 LF; 136/20
[51] Int. Cl.². ...................................... H01M 10/00
[58] Field of Search............. 136/6 LN, 6 FS, 6 LF, 136/6 F, 20; 75/134 A, 134 S

[56] References Cited
UNITED STATES PATENTS

| | | | |
|---|---|---|---|
| 1,869,494 | 8/1932 | Osborg............................. | 75/135 X |
| 3,508,967 | 4/1970 | Lyall et al..................... | 136/6 LN X |
| 3,563,730 | 2/1971 | Bach et al...................... | 75/134 A X |
| 3,645,792 | 2/1972 | Hacha............................... | 136/6 LF |
| 3,716,409 | 2/1973 | Cairns et al........................ | 136/6 R |
| 3,827,910 | 8/1974 | Cairns et al...................... | 136/20 X |

OTHER PUBLICATIONS

Mechanical Engineers Handbook, Sixth Ed., 1958, pp. 6-68, 6-69.

*Primary Examiner*—John H. Mack
*Assistant Examiner*—C. F. LeFevour
*Attorney, Agent, or Firm*—L. Lee Humphries; Henry Kolin; Clark E. DeLarvin

[57] ABSTRACT

An improved lithium electrode structure comprises an alloy of lithium and silicon in specified proportions and a supporting current-collecting matrix in intimate contact with said alloy. The lithium electrode of the present invention is utilized as the negative electrode in a rechargeable electrochemical cell.

17 Claims, 3 Drawing Figures

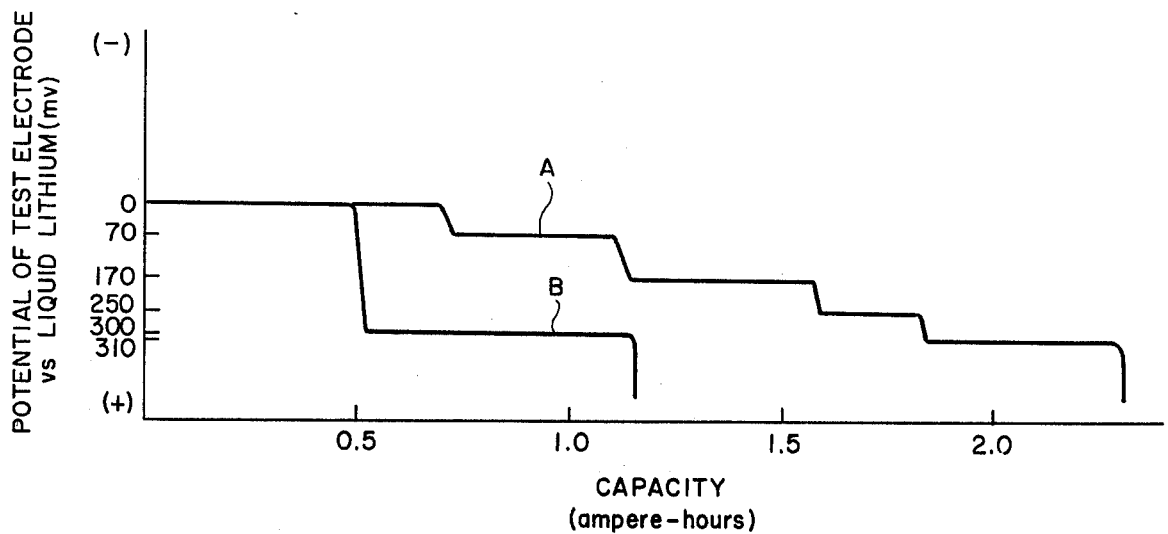
FIG. 1
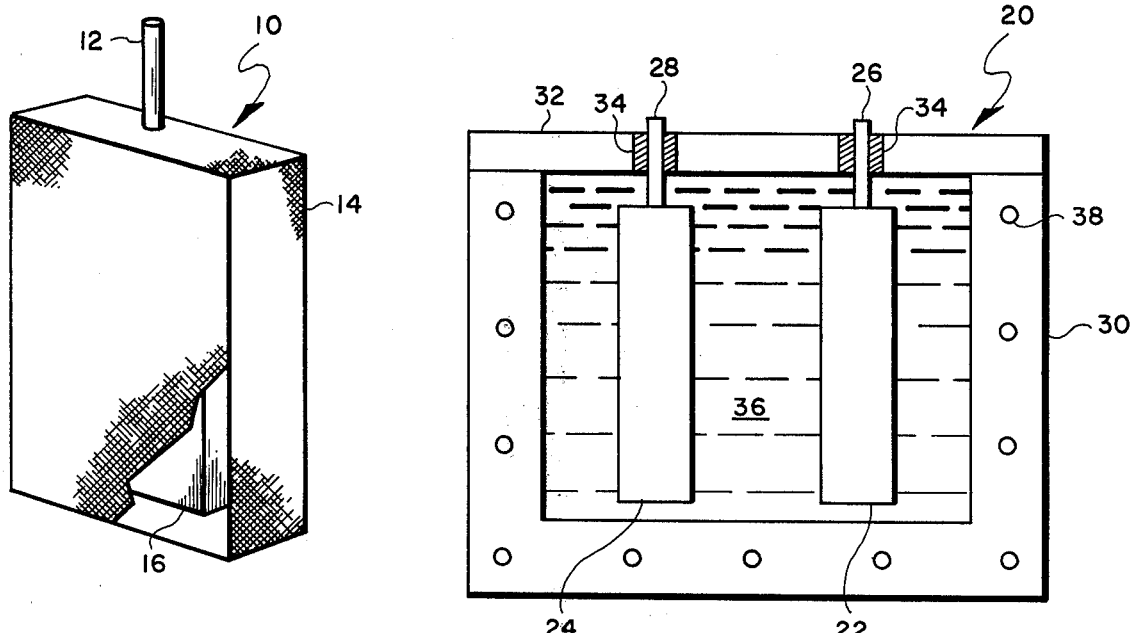
FIG. 2
FIG. 3

LITHIUM ELECTRODE AND AN ELECTRICAL ENERGY STORAGE DEVICE CONTAINING THE SAME

This is a continuation of application Ser. No. 512,635 filed Oct. 7, 1974.

BACKGROUND OF THE INVENTION

1. Field of the Invention

The invention broadly relates to electrical energy storage devices and more particularly to a lithium electrode structure and a secondary electrochemical cell utilizing the same.

2. Prior Art

Two approaches generally have been followed in the construction of a lithium electrode for use in an electrical energy storage device, such as a rechargeable battery, particularly one employing a molten salt electrolyte. In one approach, the lithium is alloyed with another metal such as, for example, aluminum to form a solid electrode at the operating temperature of the cell. In the other approach, liquid lithium is retained in a foraminous metal substrate by capillary action. Heretofore, the latter approach has been preferred because it offers higher operating cell voltages and therefore potentially higher battery energy densities. Certain problems are encountered, however, when it is attempted to retain molten lithium in a foraminous metal substrate. More particularly, most metals which are readily wetted by lithium are too soluble in the lithium to permit their use as the metal substrate, whereas most metals structurally resistant to attack by molten lithium are poorly wetted by the lithium when placed in a molten salt electrolyte.

It has been suggested that metals structurally resistant to attack by molten lithium may be wetted by immersion in molten lithium maintained at a high temperature. However, the structure so wetted by lithium at these higher temperatures usually undergoes progressive de-wetting when used as the negative electrode in a secondary battery containing a molten salt electrolyte maintained at the substantially lower temperatures at which such a battery operates. Thus after operation of the battery for a number of cycles, it has been found that lithium no longer preferentially wets the substrate, the electrode progressively losing capacity. Various methods have been proposed in an attempt to overcome this problem. See, for example, U.S. Pat. Nos. 3,409,465 and 3,634,144. None of the proposed methods have proven entirely satisfactory.

The use of a solid lithium alloy as taught by the prior art also is not without problems. More particularly, lithium-aluminum alloy, for example, is approximately 300 millivolts more positive than liquid lithium. Thus, electrochemical cells utilizing lithium-aluminum alloys as electrodes are not able to achieve the same potentials as those utilizing liquid lithium electrodes. Further, in a molten salt electrolyte, the lithium-aluminum alloy electrode expands and contracts greatly during charging and discharging of the electrochemical cell. Thus, it has been reported that the lithium-aluminum electrode may change in volume by as much as 200 percent during charging and discharging of the cell. Still, further, lithium-aluminum alloys generally are limited to a lithium content of less than about 30 wt.%.

Various other materials have been suggested for use as an alloy with lithium to form a solid electrode. In U.S. Pat. No. 3,506,490, for example, it is suggested that the lithium be alloyed with either aluminum, indium, tin, lead, silver, or copper. However, none of these materials have been proven to be completely satisfactory. More particularly, these other suggested materials, such as tin and lead for example, form alloys containing lesser amounts of lithium than does aluminum, and thus have a still lower capacity (ampere-hours) per unit weight of alloy. Further, the potential of these other alloys compared with liquid lithium is more positive than that of a lithium-aluminum alloy; thus, alloys of such other materials are less desirable. Other patents relating to solid lithium anodes include U.S. Pat. Nos. 3,506,492 and 3,508,967.

Thus a need still exists for a lithium electrode which would retain its capacity upon continued cycling when used as a negative electrode in an electrochemical cell, which preferably would have substantially the same potential as liquid lithium, and which would maintain its dimensional stability during charging and discharging of the cell.

SUMMARY OF THE INVENTION

Broadly, the present invention provides an improved lithium electrode and an electrical energy storage device such as a secondary battery or rechangeable electrochemical cell utilizing such electrode. The improved electrode comprises an alloy of lithium and silicon in intimate contact with a supporting current-collecting matrix. The lithium is present in the alloy in an amount from about 80 to 28 wt.%.

The improved electrical energy storage device comprises a rechargeable lithium battery having positive and negative electrodes spaced apart from one another and in contact with a suitable lithium-ion-containing electrolyte, preferably a molten salt electrolyte. The improved lithium electrode of the present invention is utilized as the negative electrode, functioning as the cell anode during the discharge mode of the cell.

BRIEF DESCRIPTION OF THE DRAWING

FIG. 1 is a graphical comparative representation of the typical discharge characteristics of two lithium-alloy electrodes;

FIG. 2 is a pictorial view in perspective of an electrode of the present invention; and FIG. 3 is a diagrammatic representation of an electrical energy storage device of the present invention.

DETAILED DESCRIPTION

The present invention relates to a lithium electrode and an electrical energy storage device using such an electrode.

The lithium electrode of the present invention comprises an alloy of lithium and silicon in intimate contact with a supporting current-collecting matrix, thereby generally providing a unitary or composite electrode structure. The term "alloy" as used herein is defined as an intimate mixture of the two metals in which the metals may form mixed crystals, solid solutions, or chemical compounds. The metals also may be present in more than one of these states in the same alloy. It is an essential feature of the present invention that the alloy contain from about 80 to 28 wt.% lithium and from about 20 to 72 wt.% silicon. A preferred alloy is one containing from about 60 to 40 wt.% lithium, with the balance consisting essentially of silicon. It will be appreciated that the weight percentages referred to herein refer to the electrode in its formed or fully charged state, since obviously in operation of the cell the lithium will be discharged, resulting in an alloy of substantially less or even no lithium content. The alloy also may contain minor amounts of impurities such as, for example, iron, calcium, magnesium, and aluminum.

The lithium-alloy electrode structure further includes a supporting current-collecting matrix in intimate contact with the alloy. Suitable materials for the supporting current-collecting matrix are those materials resistant to attack by lithium or lithium-silicon mixtures. Examples of such materials include iron, steel, stainless steel, nickel, titanium, tantalum, and zirconium. The purpose of providing a matrix in intimate contact with the alloy is to provide for substantially uniform current density throughout the alloy and also to provide structural support for the alloy. It has been determined that the lithium-silicon alloy utilized in the present invention lacks structural integrity when used in an electrical energy storage device as the sole component of the negative electrode, particularly in a molten salt electrolyte at its high operating temperature. To function for any significant length of time without disintegration, therefore, it is essential that the lithium alloy be provided with a supporting matrix. It is contemplated and preferred, within the scope of this invention, that the support and current-collecting capability be provided by a single structure; however, the support may be provided by one structure and the current-collecting capability by another separate structure.

The matrix may be in the form of an electronically conductive porous substrate having an apparent density of from about 10 to 30 percent of that of the base material. Advantageously, the substrate will have a median pore size within the range of from about 20 to 500 microns and preferably from about 50 to 200 microns. A particularly preferred form of such a substrate is formed from woven or non-woven wires pressed together to a desired apparent density and then sintered. Such pressed and sintered wire structures are known and commercially available as Feltmetals. The porous substrate then is impregnated with the alloy, for example, by immersion in a molten bath of the alloy followed by removal and cooling. Alternatively, the alloy may be cast about a matrix formed from a wire screen or expanded metal.

In another variation, the matrix may be in the form of a perforate container formed from wire screen or the like, and containing therein a body of the alloy alone. Alternatively, the alloy is in intimate contact with a porous substrate enclosed in the perforate container, it being desirable that the container and the substrate be in electrical contact with one another. This latter variation is particularly useful when the porous substrate is formed from very fine woven or non-woven wires pressed together to form a body.

More particularly, it has been found, at least in the case of iron used as the substrate material, that if the wire used to form the porous substrate has a diameter of less than about 10 microns, the substrate tends to break up and disintegrate upon repeated charging and discharging of the electrode in a molten salt electrolyte. It is not known with certainty whether such destruction is the result of imperceptible expansion and contraction of the electrode, or a chemical interaction between the lithium-silicon alloy and iron. In selecting material for use as a substrate, therefore, consideration should be given to any chemical reaction or corrosion that may occur as a result of the specific electrolyte or matrix material which is utilized. Further, if the matrix comprises woven or non-woven wires pressed together to provide a porous substrate, the wire should have a diameter of at least about 10 microns. Advantageously, the wire diameter will be from about 10 to about 500 microns and preferably from about 10 to 200 microns.

In a preferred embodiment of the invention, this electrode is formed by surrounding the matrix with the alloy in a molten state, for example, by immersing a porous substrate in a molten body of the alloy. The alloy may be formed by mixing particulate lithium and silicon and heating such a mixture to a sufficiently elevated temperature to form a melt. In accordance with a preferred method however, the lithium first is heated, in an inert atmosphere, to a temperature above the melting point of lithium, and thereafter the silicon is added in an amount to provide the desired weight percent for the alloy. In such latter method, the exothermic reaction between the lithium and silicon will provide substantially all of the heat required to form a melt of the alloy.

It will be appreciated that the preparation of a lithium-silicon alloy, per se, is known. The existence of such an alloy and exemplary methods by which it may be produced are reported, for example, in U.S. Pat. Nos. 1,869,494 and 3,563,730. For additional information regarding the temperature required to form a substantially homogeneous alloy of lithium and silicon, reference may also be had to the phase diagram shown in Shank, *Constitution of Binary Alloys*, second supplement, McGraw-Hill Book Company, New York (1969).

The lithium electrode may be formed electrochemically in a molten salt electrolyte in generally the same manner as known and utilized in forming lithium-aluminum electrodes. Specifically, silicon in intimate contact with the supporting current-collecting matrix is immersed in molten salt electroltye containing a source of lithium ions, and the lithium is coulombically charged into the electrode in an amount to form the desired alloy.

The present invention also provides an electrical energy storage device, particularly a secondary cell or battery, which includes the lithium electrode of the present invention as the electrically regenerable negative electrode. The electrical energy storage device also includes a positive electrode and an electrolyte broadly designated as a non-aqueous lithium-ion-containing electrolyte.

The positive electrode or cathode is an electron acceptor and contains an active material which is electropositve with respect to the lithium electrode. The active material of the cathode may be sulfur or a metal halide, sulfide, oxide or selenide. Suitable metals include copper, iron, tungsten, chromium, molybdenum, titanium, nickel, cobalt and tantalum. The sulfides of iron and copper are particularly preferred for use with molten salt electrolytes. The cathode may be formed entirely of the active material or may comprise a composite structure such as a holder of, for example, graphite containing a body of such active material.

The lithium-ion-containing non-aqueous electrolyte utilized in preferred cell embodiments is a molten salt electrolyte; alternatively, a solid electrolyte or an organic solvent electrolyte is utilizable.

The term "molten salt electrolyte" as used herein refers to a lithium halide-containing salt which is maintained at a temperature above its melting point during operation of the electrical energy storage device. The molten salt may be either a single lithium halide, a mixture of lithium halides, or a eutectic mixture of one or more lithium halides and other alkali metal or alkaline earth metal halides.

Typical examples of binary eutectic salts are lithium chloride-potassium chloride, lithium chloride-magnesium chloride, lithium chloride-sodium chloride, lithium bromide-potassium bromide, lithium fluoride-rubidium fluoride, lithium iodide-potassium iodide, and mixtures thereof. Two preferred binary salt eutectic mixtures are those lithium chloride and potassium chloride (melting point 352°C), and lithium bromide and rubidium bromide (melting point 278°C).

Examples of ternary eutectics useful as the molten salt electrolyte include calcium chloride-lithium chloride-potassium chloride, lithium chloride-potassium chloride-barium chloride, calcium chloride-lithium chloride-barium chloride, and lithium bromide-barium bromide-lithium chloride. Preferred ternary eutectic mixtures include those containing lithium-chloride, lithium fluoride and lithium iodide (melting point 341°C) and lithium chloride, lithium iodide and potassium iodide (melting point 260°C).

The suitable alkali or alkaline earth metal ion should have a deposition potential very close to or preferably exceeding deposition potentials of lithium ion in the electrolyte. Lithium halide salts can be readily combined with halides of potassium, barium, and strontium. Halides of metals such as cesium, rubidium, calcium, or sodium may be used, but a substantial proportion of these metals may be co-deposited with the lithium when the electrode is charged, with a resulting small loss in potential.

Although the ternary eutectic salt mixtures, particularly those containing the iodides, provide lower melting points, the binary eutectic mixture of lithium chloride-potassium chloride sometimes is preferred on the basis of its lower cost and availability, particularly for batteries to be used in large scale applications such as electric powered vehicles and electric utility bulk energy storage.

The solid state electrolytes contemplated herein include a mixture of lithium sulfate and a lithium halide such as lithium chloride or lithium bromide or a mixture thereof. The composition of the mixed salt solid electrolyte may vary from 10 to 95 mole % lithium sulfate. Solid electrolytes having such composition are conductive in what appears to be a solid phase at temperatures as low as about 400°C. Combinations of lithium iodide with a silver halide, silver mercuric halide, lead halide, copper halide, ammonium halide or combinations thereof also are suitable for the solid electrolyte.

The lithium electrode of the present invention also is useful in electrical energy storage devices which utilize a lithium-ion source in an organic solvent. The term "organic electrolyte" contemplates those non-aqueous electrolytes which comprise an organic solvent and a solute. The solute is the source of lithium cations. The solute also is, of course, miscible or dissolved in the organic solvent. The solvent is such that it does not attack the electrode materials and is not affected by them. Obviously the solute should be stable in its environment at the intended operating temperature and electrical potential. Organic electrolyte cells generally are designed to operate at a temperature below about 125°C., and more specifically at a temperature within the range of from about 0° to 80°C. It is important that the solute and the solvent be such as to provide a lithium ion-containing and conducting medium which is mobile or liquid under these conditions. Normally, it is preferred that the solute be of high purity.

The solutes which most nearly meet these requirements are lithium halide salts. For conductivity purposes, other metal halides, e.g., aluminum chloride, are often complexed with the lithium halide. The halide is selected from the group consisting of chlorine, fluorine, bromine, iodine, and mixtures thereof. It is envisioned that double anion complexes also could be used. Examples of suitable solutes are lithium bromide, lithium chloride, lithium fluoride, sodium chloride, sodium fluoride, and potassium chloride. The lithium salt also may be a lithium perchlorate, hexafluophosphate, tetrafluoborate, tetrachloroaluminate, or hexafluoarsenate.

Preferably, the lithium ion-containing and conducting medium used is in a saturated or supersaturated condition. The ion-containing and conducting medium should have sufficient salt concentration to permit most economical operation of the cell. The ion-containing and conducting medium should have concentration of solutes greater than about 0.5 molar.

The choice of organic solvent for the ion-containing and conducting medium is dictated by many of the considerations involving the solute. The solvent of the ion-containing and conducting medium is any polar material which meets the requirements of serving as a transfer medium for the solute and in which the solute is miscible or dissolved. The solvent also should be of such a material as to be inert to the electrode materials. The solvent is preferably a liquid at from about 0°–125°C.; operating conditions dictate such a requirement. For example, dimethylsulfoxide is an excellent solvent above its melting point of about 18.5°C. The solvent is desirably one which does not readily release hydrogen ions. Solvents of high dielectric constants and low viscosity coefficients are preferred.

Suitable solvents are, for example, the nitriles such as acetonitrile, propionitrile, sulfoxides such as dimethyl-, diethyl-, ethylmethyl- and benzylmethylsulfoxide; pyrrolidones such as N-methylpyrrolidone, and carbonates such as propylene carbonate.

In addition to the foregoing representative list of suitable electrolytes and positive electrode materials, many others will be apparent to those versed in the art. It is not intended that the invention be limited, therefore, only to those specifically identified.

Referring now to the drawing and FIG. 1 in particular, curve A depicts a typical discharge plot of an electrode of the present invention (60 wt% Li — 40 wt% Si) versus a liquid lithium counter electrode. From that plot it is seen that substantially 100 percent of the theoretical capacity (amp-hr) is recoverable from the electrode of the present invention. It also will be noted that the potential versus liquid lithium varies during discharge. Specifically, the electrode of the invention discharges through five distinct voltage plateaus.

The first plateau is at substantially the same potential as liquid lithium. Each of the four succeeding plateaus is at a potential progressively more positive with respect to liquid lithium, namely, about 70, 170, 250, and 310 mv more positive than liquid lithium. The reason for such series of different potentials is not known with certainty, and the present invention is not to be considered as limited by any particular theory. It is believed, however, that the first plateau, which is substantially the same as that for liquid lithium, occurs during discharge of unalloyed lithium, and each succeeding plateau thereafter represents a specific species of lithium-silicon compounds. It must be appreciated, however, that the known phase diagrams for lithium-silicon show only two species, i.e., $Li_4Si$ and $Li_2Si$. It is not known, therefore, whether FIG. 1 is indicative of the existence of an as yet unidentified lithium-silicon species or whether some other mechanism is involved. Obviously, knowledge of the precise mechanism involved is not necessary for the practice of the prsent invention.

For comparative purposes, also shown in FIG. 1, is curve B, a discharge curve for a typical lithium-aluminum electrode (30 wt% Li — 70 wt% Al) of equal weight. Comparing curves A and B, it is seen that the lithium electrode of the present invention has a substantially greater capacity than an equivalent prior art lithium-aluminum electrode. Such capacity is attained by virtue of the greater amount of lithium which can be contained in the lithium-silicon alloy. The prior art lithium-aluminum alloys generally are limited to a maximum of less than about 30 wt.% lithium. In actual practice, lithium-aluminum alloys are rarely used which contain more than about 20 wt.% lithium, since alloys containing greater percentages of lithium tend to release free lithium into the electrolyte with a resulting loss in coulombic efficiency, in much the same manner as occurs with the prior art liquid lithium electrodes.

It also will be noted in comparing the two curves that both alloys start off with a potential substantially the same as that of liquid lithium. At such a potential it is possible that the release of free lithium into the electrolyte may occur. When it is desired to eliminate such a possibility, the electrodes advantageously are discharged against a liquid lithium counterelectrode until the potential reaches the second plateau (about 70 mv for lithium-silicon and 300 mv for lithium-aluminum). Even after an initial discharge of the electrodes to bring them down to the second plateau, it will be seen that the electrode of the present invention has a more favorable potential than that of lithium-aluminum and still retains a substantially greater capacity (amp-hrs). Moreover, after such initial discharge, even if the electrode of the present invention is discharged completely to the end of the last plateau (310 mv), the time averaged potential will be substantially nearer that of liquid lithium than the prior art lithium-aluminum electrode. The two comparative curves shown in FIG. 1 clearly demonstrate the superiority and advantages of the lithium electrode of the present invention over that of the prior art lithium-aluminum electrodes.

Referring now to FIG. 2, a lithium electrode 10 of the present invention is shown. The electrode 10 includes a conductor wire 12 and a matrix which comprises a cage or perforate container formed from a wire screen 14 and a porous substrate impregnated with a lithium silicon alloy 16.

In FIG. 3 is depicted an electrical energy storage device 20 which utilizes the lithium alloy electrode of the present invention. The storage device 20 includes a positive electrode 22 and a negative electrode 24, the latter comprising a porous metal substrate impregnated with a lithium-silicon alloy. Electrodes 22 and 24 are provided with electrical connectors 26 and 28, respectively. The electrical energy storage device also includes a housing 30 and a cover 32. The cover 32 is provided with apertures therethrough for electrical connectors 26 and 28. Located within the apertures are electrically nonconductive insulators 34. The electrical energy storage device also includes a non-aqueous electrolyte 36. When the non-aqueous electrolyte is a solid electrolyte or a molten salt electrolyte, both of which must operate at relatively high temperatures, housing 30 also may be provided with heating means such as plurality of electrical resistance heaters 38.

The following examples are set forth for the purpose of further illustrating the present invention. For convenience, most of the examples relate to use of the electrode of the present invention in a molten salt electrolyte which is preferred. However, the invention should not be construed as limited to electrical energy storage devices utilizing a molten salt electrolyte, for, as herein disclosed, it will have equal utility in an electrical energy storage device (primary or secondary cell or battery) utilizing either a solid electrolyte or an organic electrolyte.

EXAMPLE 1

The following example demonstrates the preparation and testing of the lithium electrode of the present invention. The supporting current-collecting matrix utilized was a commercially available material known as Feltmetal comprising fine low-carbon steel fibers (approximately 10 microns in diameter) compacted into the flat porous plate ( .32 cm) and sintered. The matrix had a surface area of about 6.45 $cm^2$ per side and an apparent density of 10 percent. The median pore size was in the range from about 50 to 150 microns. The matrix was weighed and then impregnated with lithium alloy by immersing it in an alloy comprising 45 wt.% lithium and 55 wt.% silicon at a temperature between about 720° and 820°C for about 15 minutes. The matrix then was removed from the molten lithium, alloy bath, allowed to cool, and weighed again. It was determined that the matrix had retained approximately 1.32 grams of the alloy, thus forming a lithium electrode having a total theoretical capacity of 2.29 ampere hours.

The electrode was tested by placing it in a molten salt bath containing 58.8 mole % lithium chloride and 41.2 mole % potassium chloride. The molten salt electrolyte was maintained at a temperature of about 400°C, and the test electrode was alternately charged and discharged at a constant current of about 600 milliamps against a larger liquid lithium counter-electrode. The voltage potential between the two electrodes and the current flow were continuously recorded versus time on a strip chart recorder. From the chart it was determined that the average coulombic efficiency (amp-hr discharge/amp-hr charge × 100) for 4 cycles was about 100 percent.

The voltage potential versus the liquid lithium counterelectrode and the discharge characteristics were substantially the same as those depicted in FIG. 1. The test was terminated after four cycles when the fine individual fibers of the supporting matrix broke up, since this resulted in a loss of coulombic efficiency.

EXAMPLE 2

The foregoing procedure of Example 1 was repeated using a porous substrate of titanium metal for the matrix, the alloy comprising 60 wt.% Li and 40 wt.% Si. The titanium substrate had fibers approximately 100 microns in diameter, an apparent density of 19 percent, and a median pore size in the range of from 400 to 500 microns. It was tested in substantially the same manner as hereinbefore described, and the test was voluntarily terminated after 34 cycles. Coulombic efficiency averaged between 95 and 100 percent, and again the voltage versus the liquid lithium counterelectrode and the discharge characteristics were substantially the same as those depicted in FIG. 1, thus, demonstrating the advantage of the larger fiber size and the utility of titanium as the material for the matrix.

EXAMPLE 3

A porous substrate composed of iron fibers approximately 10 microns in diameter, having an apparent density of 10 percent and a median pore size within the range of from 50 to 150 microns was obtained. The porous substrate was enclosed in a perforate screen formed from steel wires having a diameter of 230 microns and a mesh size of 60 (U.S. standard sieve size) to form the matrix (similar to FIG. 2). The electrode was formed and tested in substantially the same manner as hereinbefore described but using a 60 wt.% Li — 40 wt.% Si alloy. Again a coulombic efficiency between 95 and 100 percent was obtained, and the discharge characteristics were substantially the same as those depicted in FIG. 1. This test also was voluntarily terminated after 17 cycles, thus demonstrating the utility of the two-structure combined form of supporting and current-collecting matrix, viz., separate supporting and current-collecting structures.

EXAMPLE 4

The following example is set forth to demonstrate the applicability and utility of the present lithium-silicon alloy electrode as an anode in an electrical energy storage device which utilizes an organic electrolyte. The negative lithium-silicon alloy electrode was prepared in substantially the same manner as the electrode of Example 1 but using a 60 wt.% Li — 40 wt.% Si alloy. The positive electrode comprised a porous carbon structure impregnated with iron sulfide and retained in a dense graphite holder. The organic electrolyte consisted essentially of a propylene carbonate solvent containing 100 gm lithium perchlorate per liter of solvent.

The electrical energy storage device was alternately charged and discharged at a predetermined current and for a preselected time interval. The voltage potential between the two electrodes and the current flow were continuously recorded vs. time on a strip chart recorder. From the chart it was determined that a coulombic efficiency of from about 95 to 100 percent was attained. The time-averaged voltage during discharge of the electrical energy storage device utilizing the electrode of the present invention was about 2.1 volts, whereas with a comparable lithium-aluminum electrode the time-averaged voltage would only have been about 1.8 volts. Further, no significant change or deterioration of the electrode performance was observed, thus demonstrating the utility of the fine woven iron fibers as a supporting current-collecting matrix for use in an organic electrolyte.

EXAMPLE 5

The following example is set forth to demonstrate the applicability and utility of the electrode of the present invention when used in an electrical energy storage device as the negative electrode. The electrode utilized was prepared using a commercially available substrate as the matrix. The substrate comprised a plurality of woven nickel wires having a diameter of 16 microns compressed and sintered to provide a substrate with an apparent density of 15 percent. The electrode was prepared by immersing the matrix in a bath of molten (700°C) lithium-silicon alloy (60 wt% lithium-40 wt% silicon). The electrode then was discharged against a liquid lithium counterelectrode down to the +70 mv potential plateau (see FIG. 1).

The positive electrode or cathode comprised a dense graphite holder containing a quantity of iron sulfide as the active material. This was covered with a porous graphite separator to retain the active material in the holder while still permitting the free passage therethrough of charged ions. The negative and positive electrodes were immersed in a molten salt electrolyte comprising 58.8 mol % lithium chloride and 41.2 mol % potassium chloride. The electrolyte was maintained at a temperature of about 400°C.

The electrical energy storage device was alternately charged and discharged at a predetermined current and for a preselected time interval. The voltage potential between the two electrodes and the current flow were continuously recorded vs. time on a strip chart recorder. From the chart it was determined that a coulombic efficiency of from about 96 to 100 percent was obtained. Further, the time-averaged voltage during discharge of the electrical energy storage device utilizing the electrode of the present invention was about 1.48 volts utilizing the second and third plateaus, whereas with a comparable lithium aluminum electrode the time-averaged voltage would only have been about 1.3 volts. It also was noted that there was substantially no perceptible change in size of the lithium-silicon electrode during cycling. Further, no perceptible amount of lithium was lost to the electrolyte. The test was terminated after four cycles because of a failure of one of the cathode components. Nonetheless, the results clearly demonstrate the efficacy of the lithium electrode of the present invention and the advantages obtainable therewith.

It will of course be realized that various modifications can be made in the design and operation of the lithium electrode and cell of the present invention without departing from the spirit thereof. Thus, while the lithium electrode structure has been illustrated and described with respect to certain exemplary embodiments relating to particular preferred constructions and materials for the supporting current-conducting matrix, and while preferred embodiments of secondary cells utilizing molten salt electrolytes and metal sulfide cathodes have been illustrated and described, it should be understood that within the scope of the appended claims the invention may be practiced otherwise than as specifically illustrated and described.

What is claimed is:

1. A composite negative electrode structure for an electrical energy storage device having a lithium-containing electrolyte wherein said composite electrode structure comprises:
    a supporting current-collecting matrix in intimate contact with an alloy of lithium and silicon, said lithium being present in said alloy in an amount from about 28 to 80 wt.% and said silicon being present in said alloy in an amount from about 20 to 72 wt.%.
2. The electrode structure of claim 1 wherein said alloy comprises lithium in an amount from about 40 to 60 wt.%, and silicon in an amount from about 40 to 60 wt.%, and wherein said matrix comprises a porous metal substrate.

3. The electrode structure of claim 1 wherein said supporting current-collecting matrix includes a porous substrate formed from metal fibers.

4. The electrode structure of claim 1 wherein the supporting current-collecting matrix comprises a porous metal substrate impregnated with said alloy and further includes a perforate container enclosing the porous metal substrate.

5. The electrode structure of claim 3 wherein said metal fibers are iron fibers having a diameter of from at least 10 to 200 microns.

6. The electrode structure of claim 3 wherein said metal fibers are nickel fibers having a diameter of from about 10 to 200 microns.

7. The electrode structure of claim 3 wherein said metal fibers are titanium fibers having a diameter of from about 10 to 200 microns.

8. An electrical energy storage device including a positive electrode and composite negative electrode structure spaced apart from one another and in contact with a lithium containing electrolyte wherein said composite negative electrode structure comprises a supporting current-collecting matrix in intimate contact with an alloy of lithium and silicon, said lithium being present in said alloy in an amount of from about 80 to 28 wt.% and said silicon being present in said alloy in an amount of from about 20 to 72 wt.%.

9. The electrical energy storage device of claim 8 wherein said alloy comprises lithium in an amount from about 40 to 60 wt.%, and silicon in an amount from about 40 to 60 wt.%, and wherein said matrix comprises a porous metal substrate.

10. The electrical energy storage device of claim 8 wherein said supporting current-collecting matrix includes a porous substrate formed from metal fibers.

11. The electrical energy storage device of claim 8 wherein the supporting current-collecting matrix comprises a porous metal substrate impregnated with said alloy and further includes a perforate container enclosing the porous metal substrate.

12. The electrical energy storage device of claim 8 wherein said positive electrode contains a metal sulfide as the active material.

13. The electrical energy storage device of claim 8 wherein said lithium-containing electrolyte comprises a mixture of a lithium halide and at least one other alkali metal halide.

14. The electrical energy storage device of claim 10 wherein said metal fibers are iron fibers having a diameter of from at least 10 to 200 microns.

15. The electrical energy storage device of claim 10 wherein said metal fibers are nickel fibers having diameter of from about 10 to 200 microns.

16. The electrical energy storage device of claim 10 wherein said metal fibers are titanium fibers having a diameter of from about 10 to 200 microns.

17. The electrical energy storage device of claim 12 wherein said lithium-containing electrolyte is a salt which is molten at the operating temperature of the device.

* * * * *

UNITED STATES PATENT AND TRADEMARK OFFICE
CERTIFICATE OF CORRECTION

PATENT NO. : 3,969,139
DATED : July 13, 1976
INVENTOR(S) : San-Cheng Lai

It is certified that error appears in the above-identified patent and that said Letters Patent are hereby corrected as shown below:

Column 4, lines 51-52, "electropositve" should read --electropositive--.
Column 5, line 12, after "those" insert --of--.
Column 7, line 12, "prsent" should read --present--.
Column 8, line 28, "( .32 cm)" should read --($\simeq$ .32 cm)--.
Column 10, line 44, "with" should read --without--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*